(12) United States Patent
Leone et al.

(10) Patent No.: US 10,408,183 B2
(45) Date of Patent: Sep. 10, 2019

(54) METHODS AND SYSTEMS FOR IMPROVING ENGINE STARTER DURABILITY FOR A STOP/START VEHICLE

(71) Applicant: Ford Global Technologies, LLC, Dearborn, MI (US)

(72) Inventors: Thomas G. Leone, Ypsilanti, MI (US); Kenneth James Miller, Canton, MI (US); Eric Michael Rademacher, Beverly Hills, MI (US); Alexander O'Connor Gibson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 15/452,448

(22) Filed: Mar. 7, 2017

(65) Prior Publication Data

US 2018/0258897 A1  Sep. 13, 2018

(51) Int. Cl.
*F02N 11/04* (2006.01)
*F02N 11/08* (2006.01)
*F02N 11/10* (2006.01)

(52) U.S. Cl.
CPC ...... *F02N 11/0825* (2013.01); *F02N 11/0818* (2013.01); *F02N 11/0851* (2013.01); *F02N 11/106* (2013.01); *F02N 11/108* (2013.01); *F02N 11/04* (2013.01); *F02N 2200/022* (2013.01); *F02N 2200/0801* (2013.01); *F02N 2200/12* (2013.01); *F02N 2200/123* (2013.01); *F02N 2200/14* (2013.01); *Y02T 10/48* (2013.01)

(58) Field of Classification Search
CPC .. F02N 11/04; F02N 11/0818; F02N 11/0825; F02N 11/084; F02N 11/106; F02N 11/108
USPC ...................................................... 123/179.4
See application file for complete search history.

(56) References Cited

U.S. PATENT DOCUMENTS

| 7,390,283 | B2 | 6/2008 | Rinderknecht |
| 8,935,075 | B2 | 1/2015 | Otanez et al. |
| 9,045,132 | B1 * | 6/2015 | Zhao ................... F02N 11/0825 |
| 2011/0130901 | A1 | 6/2011 | Mori et al. |
| 2013/0238225 | A1 * | 9/2013 | Morita ................ F02N 11/0818 |
| | | | 701/112 |

(Continued)

FOREIGN PATENT DOCUMENTS

WO   2016014396 A1   1/2016

OTHER PUBLICATIONS

Leone, Thomas G., "System and Method to Extend Operating Time of Valve Actuators of an Internal Combustion Engine," U.S. Appl. No. 15/272,999, filed Sep. 22, 2016, 41 pages.

(Continued)

*Primary Examiner* — Erick R Solis
(74) *Attorney, Agent, or Firm* — Jula Voutyras; McCoy Russell LLP

(57) ABSTRACT

Systems and methods for restarting an engine are presented. In one example, an engine may be automatically stopped and started in response to thresholds that may be adjusted as a distance traveled by the vehicle increases. The thresholds may be adjusted responsive to useful life consumed of an engine starter that may participate in automatic engine starting and stopping.

19 Claims, 6 Drawing Sheets

(56) References Cited

U.S. PATENT DOCUMENTS

| | | | |
|---|---|---|---|
| 2013/0338908 A1* | 12/2013 | Nakamura | F02N 11/087 |
| | | | 701/113 |
| 2014/0121865 A1* | 5/2014 | Anderson | F02N 11/0822 |
| | | | 701/22 |
| 2014/0191513 A1* | 7/2014 | Kees | F02N 11/006 |
| | | | 290/38 R |
| 2014/0214309 A1* | 7/2014 | Atluru | F02D 35/0007 |
| | | | 701/112 |
| 2014/0288803 A1 | 9/2014 | Deisler | |
| 2015/0292465 A1* | 10/2015 | Wright | F02N 11/0848 |
| | | | 701/22 |
| 2016/0305388 A1 | 10/2016 | Miller et al. | |

OTHER PUBLICATIONS

Leone, Thomas G., et al., "Methods and Systems for Improving Electric Energy Storage Device Durability for a Stop/Start Vehicle," U.S. Appl. No. 15/452,398, filed Mar. 7, 2017, 48 pages.

* cited by examiner

METHODS AND SYSTEMS FOR IMPROVING ENGINE STARTER DURABILITY FOR A STOP/START VEHICLE

FIELD

The present description relates to a system and methods for improving durability of an engine starter for a vehicle with an engine that may be automatically stopped and started. The methods may be particularly useful for extending engine starter life while still enabling automatic engine starting and stopping.

BACKGROUND AND SUMMARY

An internal combustion engine often includes an engine starter motor for rotating the engine from a stopped state to a cranking speed. The starter may engage the engine during engine starting and it may be disengaged from the engine after the engine starts and is rotating under its own power. The engine starter may engage the engine while the engine is approaching zero speed to decrease engine starting time for vehicles that have engines that may be automatically stopped and started (e.g., stop/start vehicles). In addition, the starter may reengage the engine at higher speeds if there is an indication that the engine should continue to operate after an engine stopping procedure has begun. In other examples, the starter may be in the form of an integrated starter/generator or a belt driven starter/generator. Integrated starter/generators and belt driven starter/generators may be coupled to the engine so that engaging the engine is not necessary. Nevertheless, whether the engine starter is a conventional starter that selectively engages and disengages from the engine or a form of integrated starter/generator, the starter may be used at a much higher frequency in a stop/start vehicle than in vehicles with engines that remain running except when stopped by the vehicle's human driver. Starters that are used more frequently may be constructed more robustly to meet life cycle requirements. However, increasing robustness of a starter to meet a desired starter life cycle may increase system cost. Therefore, it may be desirable to provide an engine starting system that meets a desired life cycle at a desirable cost.

The inventors herein have recognized the above-mentioned issues and have developed a vehicle operating method, comprising: estimating an amount of engine starter useful life consumed via a controller; adjusting automatic engine stop/start thresholds in response to the amount of engine starter useful life consumed; and starting or stopping the engine in response to the automatic engine start/stop thresholds via the controller.

By adjusting automatic engine stopping and starting thresholds in response to an amount of engine starter useful life consumed, it may be possible to decrease frequency and rigorousness of automatic engine stops and starts so that an engine starter may operate over its expected life cycle without grossly increasing system cost. In addition, automatic engine stopping and starting may still be permitted with the engine starter so that the vehicle's fuel efficiency may be relatively high. In some examples, if the percent of useful life consumed of the engine starter is less than a threshold, the automatic engine stopping and starting thresholds may be returned to base values. In this way, automatic engine stopping and stopping entry conditions may be made more or less rigorous depending on how the engine has been previously stopped and started so that engine starter life may meet expectations while delivering desirable fuel economy.

The present description may provide several advantages. For example, the approach may allow an engine starter to reach a desired life span. In addition, the approach may allow engine starter life spans to be met without having to make the engine starter suitable for extreme duty cycle conditions. Also, the approach adjusts for severity of engine starter use to increase engine starter life and providing desirable fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
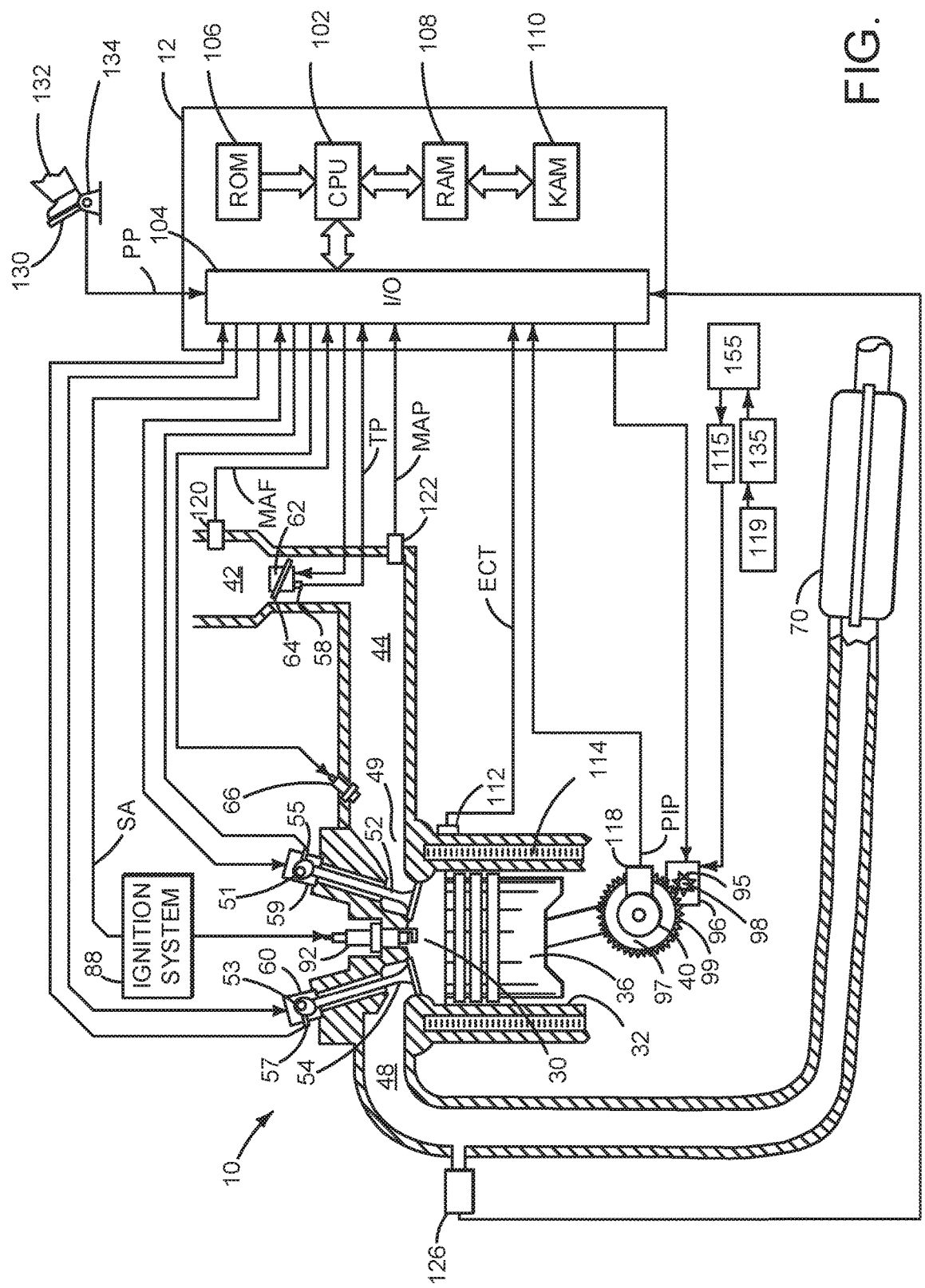
FIG. 1 is a schematic diagram of an engine.

The present description is related to extending life of an engine starter for a stop/start vehicle. The engine may be automatically stopped and started based on vehicle conditions. FIG. 1 shows an example engine that may be automatically stopped and started. The engine is shown in an example powertrain in FIG. 2. An example useful life consumed curve is shown in FIG. 3. A prophetic sequence for extending vehicle component life according to the method of FIG. 5 is shown in FIG. 4. A method for providing desired engine starter life over a predetermined vehicle travel distance while providing desirable fuel economy is shown in FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40 via variable intake cam actuator 59 and variable exhaust cam actuator 60.

Starter 96 may receive electrical power from electric energy storage device 155 (e.g., battery or ultra-capacitor) via power relay or inverter system 115. Power relay/inverter 115 may close to allow current to flow from electric energy storage device 155 to starter 96 in response to a signal from controller 12. Power relay 115 may open to interrupt current flow from electric energy storage device 155 to starter 96 in response to a signal from controller 12. DC/DC converter 135 may provide power to electric energy storage device 155 from alternator or integrated starter generator 119. Crankshaft 40 may rotate alternator or integrated starter generator 119 to produce electrical power to charge electric energy storage device 155. In alternate embodiments, the starter may be powered hydraulically or pneumatically or by a flywheel.

Fuel injector 66 is shown positioned to inject fuel directly into cylinder intake port 49, which is known to those skilled in the art as port fuel injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
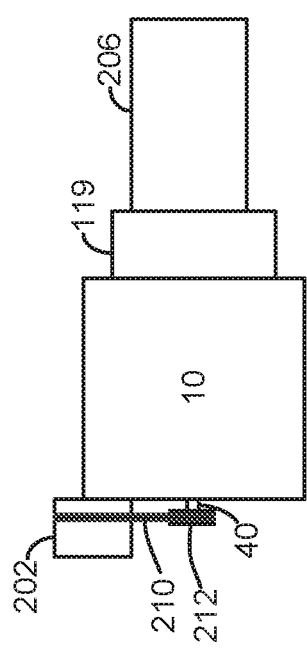
FIG. 2 is a schematic diagram of the engine if FIG. 1 in a powertrain.
Figure 3:
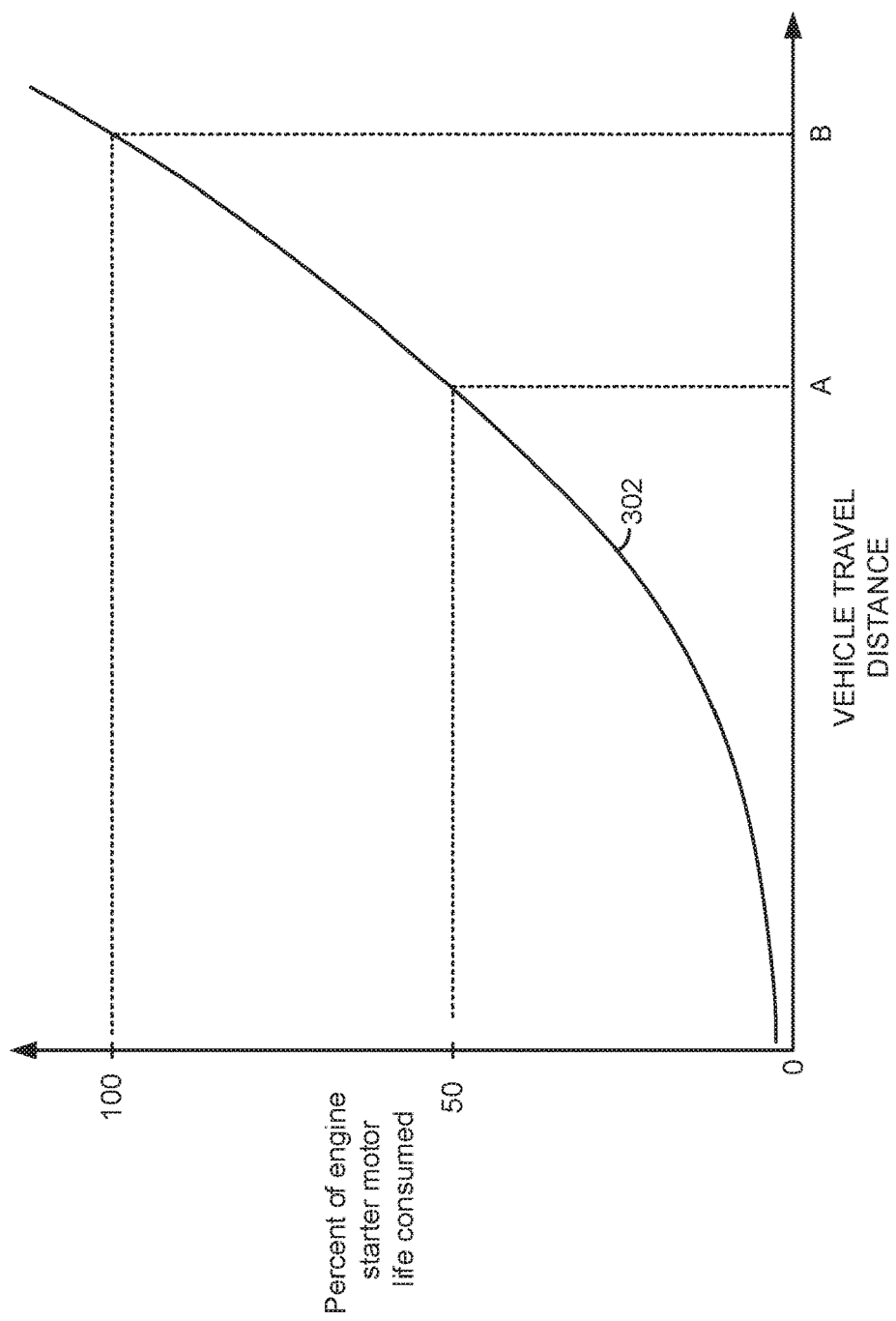
FIG. 3 is a prophetic example plot illustrating useful engine starter life consumed versus vehicle travel distance.

Referring now to FIG. 2, a powertrain including engine 10 from FIG. 1 is shown. In this example powertrain, a belt driven starter/generator (BISG) 202 is shown mechanically coupled to engine crankshaft 40 via belt 210 and pulley 210. BISG may operate as a starter to rotate engine 10, or alternatively, as a generator to supply electrical power to electric energy storage device 155 shown in FIG. 1. Integrated starter/generator (ISG) 119 is shown directly coupled to engine 10 and transmission 206. Transmission 206 may be a step ratio transmission or a continuously variable transmission, and transmission 206 delivers power from engine 10 to vehicle wheels (not shown). In some examples, starter 96 shown in FIG. 1 may be omitted when BISG 202 and/or ISG 119 is included in the vehicle system. Further, a driveline disconnect clutch (not shown) may be positioned between engine and ISG 119 in some examples. BISG and/or ISG may rotate engine 10 to start engine 10 after engine 10 has been stopped. Further, BISG and/or ISG may provide torque to accelerate engine 10 if combustion is ceased within engine 10 but engine 10 is still rotating and an engine start has been requested. As such, BISG 202 and/or ISG 119 may also be referred to as an engine starter and the methods described herein apply to BISG 202 and ISG 119.

The system of FIGS. 1 and 2 provides for a vehicle system, comprising: an engine including an engine starter; and a controller including non-transitory instructions executable to adjust automatic engine stop/start thresholds in response to an amount of useful life consumed of the engine starter, and to automatically start or stop the engine in response to the automatic engine start/stop thresholds, the automatic engine start/stop thresholds including a minimum predicted engine stop duration after an automatic engine stop threshold. The vehicle system includes where the engine starter selectively engages and disengages the engine. The vehicle system includes where the starter is an integrated starter/generator. The vehicle system includes where the starter is a belt driven starter/generator. The vehicle system includes where the automatic engine stop/start thresholds include a maximum engine starter temperature threshold. The vehicle system includes where automatic engine stop/start thresholds include a maximum engine speed threshold.

Referring now to FIG. 3, a prophetic example plot illustrating an estimated of percentage useful engine starter life consumed versus vehicle travel distance is shown. The relationship shown in FIG. 2 may be incorporated into the system of FIG. 1 and the method of FIG. 3.

The plot includes a vertical axis representing percent of useful engine starter life consumed and the vertical axis starts at a value of zero and ends at a value of one hundred. The horizontal axis represents a distance traveled by the vehicle and the actual distance traveled by the vehicle increases from the left side of the figure to the right side of the figure. The distance traveled at the vertical axis is zero.

Curve 302 shows an example relationship of percentage of useful engine starter life consumed and distance traveled by the vehicle. In this example, the engine starter is expected to be degraded when the percentage of useful of the engine starter life consumed is one hundred percent. The distance traveled by the vehicle is expected to be the value at B when one hundred percent of useful engine starter life is consumed. Thus, the engine starter may be expected to operate for the distance corresponding to B. Similarly, half the useful life of the engine starter, or fifty percent of useful engine starter life consumed, may be expected to be consumed when the vehicle has traveled the distance corresponding to A. Curve 202 may be empirically determined from a variety of vehicle and engine starter operating conditions as discussed in further detail with regard to method 500.

The percent of useful engine starter life consumed may be estimated from curve 302 by determining an actual total distance traveled by the vehicle and indexing a table or function via the actual total distance traveled by the vehicle. The point on curve 302 where the distance traveled by the vehicle intersects curve 302 corresponds to a single value of useful engine starter life consumed. In this way, percentage of useful engine starter life consumed may be estimated via knowing the distance traveled by the vehicle. Data values that form curve 302 may be empirically determined and stored to controller memory.

Figure 4A:
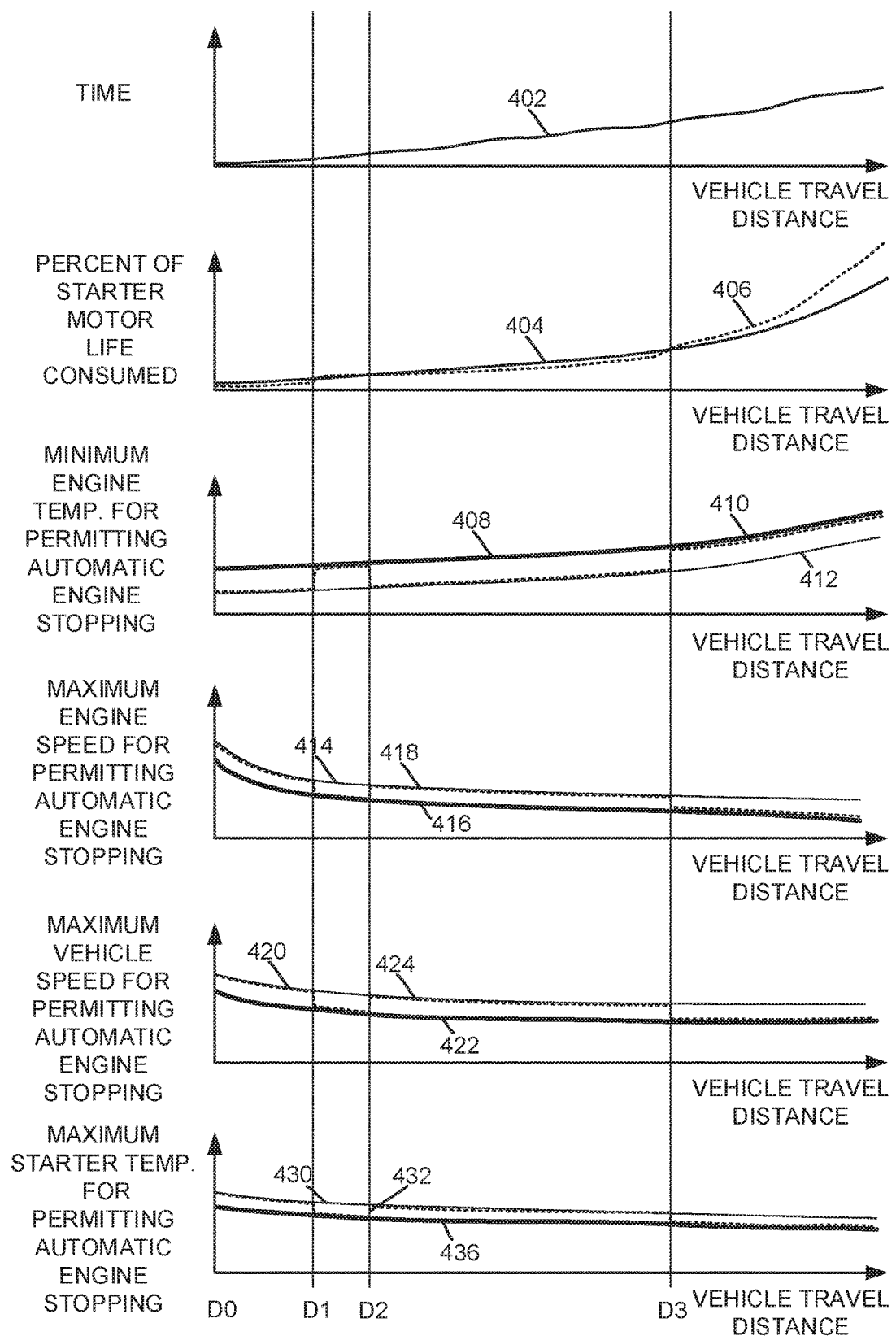
FIGS. 4A and 4B show plots of an example sequence for extending stop/start vehicle engine starter life.
Figure 4B:
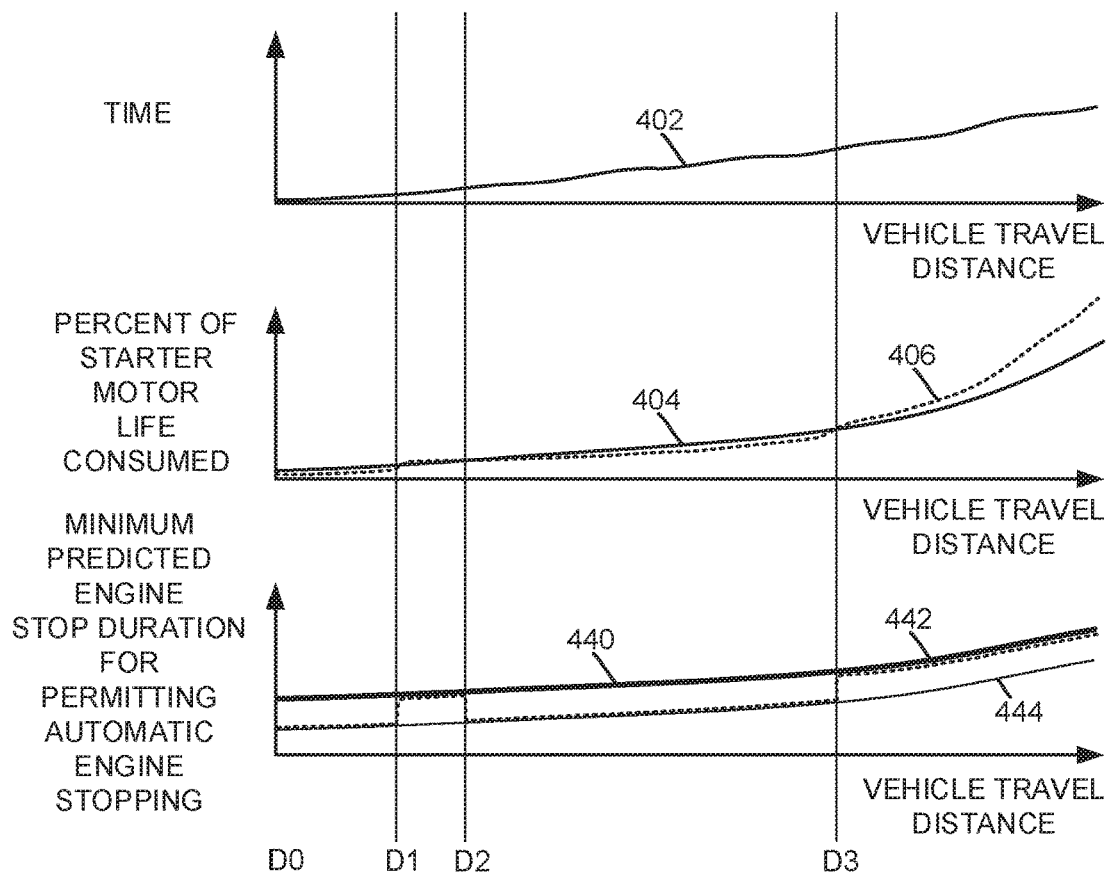
Figure 5:
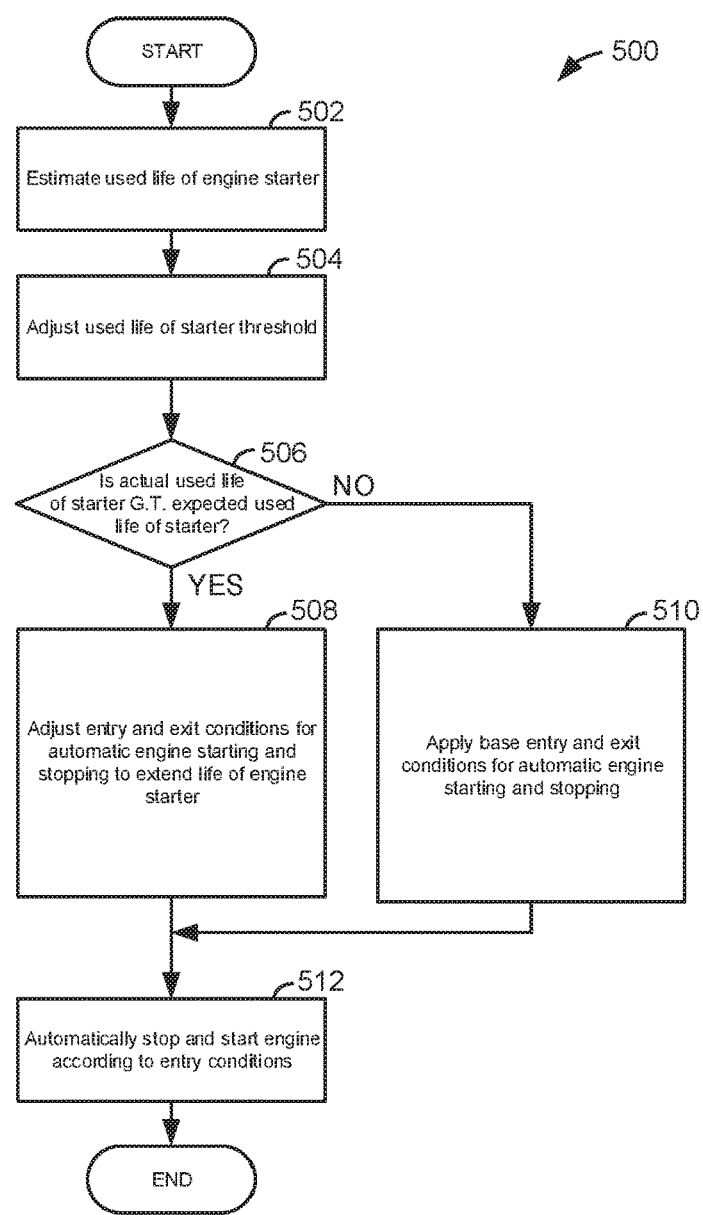
FIG. 5 is a flowchart showing one example method for extending stop/start vehicle engine starter life.

Referring now to FIGS. 4A and 4B, an example sequence illustrating modifications to an automatic engine stop/start procedure according to the method of FIG. 5 is shown. The operating sequence of FIGS. 4A and 4B may be provided via the system of FIGS. 1 and 2 executing instructions according to the method of FIG. 5 that are stored in non-transitory memory. Vertical markers D1-D3 represent times of particular interest during the sequence. All plots in FIGS. 4A and 4B are aligned with regard to vehicle travel distance. Note that a small space may exist between traces to improve visibility even though the traces are described as being equal at some conditions. The first two plots from the top of FIG. 4A are repeated as the first two plots in FIG. 4B to improve the understanding of the third plot from the top of FIG. 4B.

The first plot from the top of FIG. 4A is a plot of time versus distance traveled by a vehicle. The vertical axis represents time and time increases in the direction of the vertical axis arrow. The horizontal axis represents distance traveled by the vehicle and the distance traveled increases in the direction of the horizontal axis arrow. Curve 402 indicates the relationship between time and distance traveled by the vehicle.

The second plot from the top of FIG. 4A is a plot of percentage of engine starter life consumed versus distance traveled by a vehicle. The vertical axis represents percentage of engine starter life consumed and percentage of engine starter life consumed increases in the direction of the vertical axis arrow. The percent of engine starter life consumed is zero when the engine starter is new and percent of engine starter life consumed is one hundred percent when the engine starter is degraded. The horizontal axis represents distance traveled by the vehicle and the distance traveled increases in the direction of the horizontal axis arrow. Solid line curve 404 represents a predetermined expected relationship between percent of engine starter life consumed and distance traveled by the vehicle and it may be referred to as a percentage of engine starter useful life consumed threshold. Dotted line curve 406 represents a relationship between percentage of engine starter life consumed and distance traveled by the vehicle that is determined in real-time as the vehicle is operated and travels an increasing amount of distance. Curve 406 may be referred to as the estimated percent of engine starter useful life consumed.

The third plot from the top of FIG. 4A is a plot of minimum engine temperature for automatic engine stopping versus distance traveled by a vehicle. The minimum engine temperature is a threshold level of engine below which the engine is not automatically stopped. For example, if the minimum engine temperature is 30° C. and the actual or measured engine temperature is 28° C. or lower, the engine will not be automatically stopped and started. However, if the actual or measured engine temperature is 31° C. then the engine may be automatically stopped and started. The vertical axis represents minimum engine temperature for automatic engine stopping and minimum engine temperature for automatic engine stopping increases in the direction of the vertical axis arrow. The horizontal axis represents distance traveled by the vehicle and the distance traveled increases in the direction of the horizontal axis arrow. At higher engine temperatures, engine oil viscosity is lower and engine cranking torque may be reduced. At lower engine temperatures, engine oil viscosity is higher and engine cranking torque may increase. Thus, stress on an engine starter may be reduced when the engine starter is activated at higher engine temperatures. By only allowing automatic engine starting and stopping at higher engine temperatures, stress on the engine starter may be reduced so as to increase engine starter life.

Solid line curve 412 represents a relationship between minimum engine temperature for automatic engine stopping and distance traveled by the vehicle for an engine starter exhibiting a low amount of degradation. Curve 412 may also be referred to as minimum engine temperature threshold for automatic engine stopping for an engine starter exhibiting a low amount of degradation or a lower engine temperature threshold for automatic engine stopping for an engine starter exhibiting a low amount of degradation. Solid line curve 408 represents a relationship between minimum engine temperature for automatic engine stopping and distance traveled by the vehicle for an engine starter that is older and exhibiting a higher level of degradation. Curve 408 may also be referred to as minimum engine temperature threshold for automatic engine stopping for an engine starter exhibiting a higher amount of degradation or a lower engine temperature threshold for automatic engine stopping for an engine starter exhibiting a higher amount of degradation. Dashed line curve 410 represents a minimum engine temperature threshold for permitting automatic engine stopping responsive to the percentage of useful engine starter life consumed at the present distance traveled by the vehicle. Operating the engine starter when engine temperature is above curve 410 may degrade the engine starter in an undesirable way (e.g., higher current consumption than desired) so automatic engine starting may be prohibited when engine temperature is above temperatures of curve 410.

The fourth plot from the top of FIG. 4A is a plot of maximum engine speed for permitting automatic engine stopping versus distance traveled by a vehicle. The maximum engine speed for permitting automatic engine stopping is a threshold level of engine speed above which the engine is not automatically stopped. For example, if the maximum engine speed is 1200 RPM and the actual or measured engine speed is 1250 RPM, the engine will not be automatically stopped and started. However, if the actual or measured engine speed is 1100 RPM then the engine may be automatically stopped and started. The vertical axis represents maximum engine speed for permitting automatic engine stopping and maximum engine speed for permitting automatic engine stopping increases in the direction of the vertical axis arrow. The horizontal axis represents distance traveled by the vehicle and the distance traveled increases in the direction of the horizontal axis arrow.

Solid line curve 414 represents a relationship between maximum engine speed for permitting automatic engine stopping and distance traveled by the vehicle for a new engine starter. Curve 414 may also be referred to as maximum engine speed threshold for automatic engine stopping for an engine starter exhibiting a low amount of degradation or an upper engine speed threshold for automatic engine stopping for an engine starter exhibiting a low amount of degradation. Solid line curve 416 represents a relationship between maximum engine speed for permitting automatic engine stopping and distance traveled by the vehicle for an engine starter that is older and partially degraded. Curve 416 may also be referred to as maximum engine speed threshold for automatic engine stopping for an engine starter exhibiting a higher amount of degradation or an upper engine speed threshold for automatic engine stopping for an engine starter exhibiting a higher amount of degradation. Dashed line curve 418 represents a maximum engine speed threshold for permitting automatic engine stopping responsive to the percentage of engine starter life consumed at the present distance traveled by the vehicle. Operating the engine starter when engine speed is above curve 418 may degrade the engine starter in an undesirable way (e.g., higher current consumption than desired and component impact levels greater than desired) so automatic engine starting may be prohibited when engine speed is above speeds of curve 418.

The fifth plot from the top of FIG. 4A is a plot of maximum vehicle speed for permitting automatic engine stopping versus distance traveled by a vehicle. The maximum vehicle speed for permitting automatic engine stopping is a threshold level of vehicle speed above which the engine is not automatically stopped. For example, if the maximum vehicle speed for permitting automatic engine stopping is 35 Kph and the actual or measured vehicle speed 40 Kph, the engine will not be automatically stopped and started. However, if the actual or measured vehicle speed is 30 Kph, then the engine may be automatically stopped and started. The vertical axis represents maximum vehicle speed for permitting automatic engine stopping and maximum vehicle speed for permitting automatic engine stopping increases in the direction of the vertical axis arrow. The horizontal axis represents distance traveled by the vehicle and the distance traveled increases in the direction of the horizontal axis arrow.

Solid line curve 420 represents a relationship between maximum vehicle speed for permitting automatic engine stopping and distance traveled by the vehicle for a new engine starter. Curve 420 may also be referred to as the maximum vehicle speed threshold for permitting automatic engine stopping for an engine starter exhibiting a lower amount of degradation or an upper vehicle speed threshold for permitting automatic engine stopping for an engine starter exhibiting a lower amount of degradation. Solid line curve 422 represents a relationship between maximum vehicle speed for permitting automatic engine stopping and distance traveled by the vehicle for an engine starter that is older and partially degraded. Curve 422 may also be referred to as maximum vehicle speed threshold for permitting automatic engine stopping for an engine starter exhibiting a higher amount of degradation or an upper vehicle speed threshold for permitting automatic engine stopping for an engine starter exhibiting a higher amount of degradation. Dashed line curve 424 represents a maximum vehicle speed for permitting automatic engine stopping responsive to the percentage of engine starter life consumed at the present distance traveled by the vehicle. Operating the engine starter when vehicle speed is above curve 424 may degrade the engine starter in an undesirable way (e.g., higher current consumption than desired and component impact levels greater than desired) so automatic engine starting may be prohibited when vehicle speed is above vehicle speeds of curve 424.

The sixth plot from the top of FIG. 4A is a plot of maximum engine starter temperature for permitting automatic engine stopping versus distance traveled by a vehicle. The maximum engine starter temperature for permitting automatic engine stopping is a threshold level of starter temperature above which the engine is not automatically stopped. For example, if the maximum engine starter temperature for permitting automatic engine stopping is 105° C. and the actual or measured engine starter temperature is 106° C., the engine will not be automatically stopped and started. However, if the actual or measured engine starter temperature is 100° C., then the engine may be automatically stopped and started. The vertical axis represents maximum engine starter temperature for permitting automatic engine stopping and maximum engine starter temperature for permitting automatic engine stopping increases in the direction of the vertical axis arrow. The horizontal axis represents distance traveled by the vehicle and the distance traveled increases in the direction of the horizontal axis arrow.

Solid line curve 430 represents a relationship between maximum engine starter temperature for permitting automatic engine stopping and distance traveled by the vehicle for a new engine starter. Curve 430 may also be referred to as the maximum engine starter temperature threshold for permitting automatic engine stopping for an engine starter exhibiting a lower amount of degradation or an upper engine starter temperature threshold for permitting automatic engine stopping for an engine starter exhibiting a lower amount of degradation. Solid line curve 436 represents a relationship between maximum engine starter temperature for permitting automatic engine stopping and distance traveled by the vehicle for an engine starter that is older and partially degraded. Curve 436 may also be referred to as maximum engine starter temperature threshold for permitting automatic engine stopping for an engine starter exhibiting a higher amount of degradation or an upper engine starter temperature threshold for permitting automatic engine stopping for an engine starter exhibiting a higher amount of degradation. Dashed line curve 432 represents a maximum engine starter temperature for permitting automatic engine stopping responsive to the percentage of engine starter life consumed at the present distance traveled by the vehicle. Operating the engine starter at temperatures above curve 432 may degrade the engine starter in an undesirable way (e.g., varnish on the windings may be degraded) so automatic engine starting may be prohibited when engine starter temperature is above temperatures of curve 432.

The third plot from the top of FIG. 4B is a plot of minimum predicted engine stopping duration after an automatic engine stop versus distance traveled by a vehicle. The minimum predicted engine stopping duration is a threshold level of predicted engine stopping time after an automatic engine stop below which the engine is not automatically stopped. For example, if the minimum predicted engine stopping time after an automatic engine stop is 30 seconds and the engine is predicted to stop for 20 seconds after an automatic engine stop, the engine will not be automatically stopped and started. However, if the engine is predicted to be stopped for 45 seconds after an automatic engine stop, then the engine may be automatically stopped and started. The vertical axis represents minimum predicted engine stopping time or duration after an automatic engine stop and the minimum predicted engine stopping time or duration increases in the direction of the vertical axis arrow. The horizontal axis represents distance traveled by the vehicle and the distance traveled increases in the direction of the horizontal axis arrow. If the engine is allowed to stop (e.g., cease rotation) for shorter stopping durations, the actual total number of engine stops may increase quickly so as to increase work performed via the engine starter. Thus, stress on an engine starter may be reduced when the engine is required to be predicted to be stopped for a longer time duration before automatic engine stopping is allowed.

Solid line curve 444 represents a relationship between minimum predicted engine stopping duration for automatic engine stopping and distance traveled by the vehicle for an engine starter exhibiting a low amount of degradation. Curve 444 may also be referred to as minimum predicted engine stopping duration (e.g., amount of time after a most recent automatic engine stop until the engine begins rotating) threshold for automatic engine stopping for an engine starter exhibiting a low amount of degradation or a lower predicted engine stopping duration after an automatic engine stop threshold for automatic engine stopping for an engine starter exhibiting a low amount of degradation. Solid line curve 440 represents a relationship between minimum predicted engine stopping duration for automatic engine stopping and distance traveled by the vehicle for an engine starter that is older and exhibiting a higher level of degradation. Curve 440 may also be referred to as minimum predicted engine stopping duration threshold for automatic engine stopping for an engine starter exhibiting a higher amount of degradation or a lower predicted engine stopping duration after an automatic engine stop threshold for automatic engine stopping for an engine starter exhibiting a higher amount of degradation. Dashed line curve 442 represents a minimum predicted engine stopping duration after an automatic engine stop threshold for permitting automatic engine stopping responsive to the percentage of useful engine starter life consumed at the present distance traveled by the vehicle. Operating the engine starter when the predicted engine stop duration after an automatic engine stop is below curve 442 may degrade the engine starter in an undesirable way (e.g., more frequent use than is expected) so automatic engine starting may be prohibited when predicted engine stopping duration is less than the time below curve 442.

In one example, the predicted engine stopping duration after a most recent automatic engine stop may be predicted before the engine is stopped based on past vehicle travel history and/or vehicle navigation information. In one example, engine stopping durations at way points along a vehicle travel path are stored to controller memory. The controller retrieves the durations from memory when the vehicle approaches a way point and the duration of the previous engine stop at the location is a prediction of engine stopping duration. Speeds of other vehicles along a travel route may also be a basis for predicting engine stopping duration along a vehicle travel path. For example, if vehicles ahead of the present vehicle are stopping for 50 seconds between vehicle stops, the vehicle may be predicted to stop the engine for 50 seconds upon reaching the position that the other vehicles previously assumed.

At travel distance D0, the amount of time in the first plot is zero and the estimated percent of engine starter life consumed (curve 406) is less than the predetermined percent of engine starter life consumed threshold (curve 404). The minimum engine temperature for automatic engine stopping (curve 410) is adjusted to a low level that is equal to the threshold minimum engine temperature for automatic engine stopping for an engine starter exhibiting a low amount of degradation (curve 412). Therefore, the engine is permitted to automatically stop and start when engine temperature is greater than the level of curve 412 because the engine starter is exhibiting a low amount of degradation. The maximum engine speed for permitting automatic engine stopping (curve 418) is adjusted to a higher level that is equal to the maximum engine speed threshold for automatic engine stopping for an engine starter exhibiting a low amount of degradation (curve 414). Consequently, the engine is permitted to automatically stop and start when engine speed is at a higher level because the engine starter is exhibiting a low amount of degradation. The maximum vehicle speed for permitting automatic engine stopping (curve 424) is adjusted to a higher level that is equal to the maximum vehicle speed threshold for permitting automatic engine stopping for an engine starter exhibiting a lower amount of degradation (curve 420). As such, the engine is permitted to automatically stop and start when vehicle speed is higher because the engine starter is exhibiting a low amount of degradation. The maximum engine starter temperature for permitting automatic engine stopping (curve 432) is adjusted to a higher level that is equal to the maximum engine starter temperature threshold for permitting automatic engine stopping for an engine starter exhibiting a lower amount of degradation (curve 430). As such, the engine is permitted to automatically stop and start when engine starter temperature is higher because the engine starter is exhibiting a low amount of degradation. The minimum predicted engine stop duration after an automatic engine stop for permitting automatic engine stopping (curve 442) is adjusted to a low level that is equal to the threshold minimum predicted engine stop duration for automatic engine stopping for an engine starter exhibiting a low amount of degradation (curve 444). Therefore, the engine is permitted to automatically stop and start when predicted engine stop time after an automatic engine starter is greater than the level of curve 444 because the engine starter is exhibiting a low amount of degradation.

Between distance D0 and distance D1, the amount of time increases and the distance traveled by the vehicle increases. The estimated percent of engine starter life consumed (curve 406) increases but it remains less than the predetermined percent of engine starter life consumed threshold (curve 404). Further, the expected relationship between percent of engine starter life consumed and distance traveled by the vehicle (curve 404) increases to show that expected engine starter degradation increases with distance traveled by the vehicle. The estimated percent of engine starter life consumed (curve 406) increases but it remains less than the expected percentage of engine starter life consumed threshold (curve 404).

The minimum engine temperature for automatic engine stopping for an engine starter exhibiting a low amount of degradation (curve 412) increases to show that the minimum engine temperature for automatic engine stopping with a small amount of engine starter degradation increases as distance traveled by the vehicle increases. Likewise, minimum engine temperature for automatic engine stopping for an engine starter exhibiting a higher amount of degradation (curve 408) increases to show that minimum engine temperature for automatic engine stopping with a larger amount of engine starter degradation increases as distance traveled by the vehicle increases. The minimum engine temperature for automatic engine stopping responsive to percentage of engine starter life consumed at the present distance traveled by the vehicle (curve 410) follows and stays equal to the minimum engine temperature for automatic engine stopping for an engine starter exhibiting a low amount of degradation (curve 412).

The maximum engine speed for permitting automatic engine stopping for an engine starter exhibiting a low amount of degradation (curve 414) decreases to show that the maximum engine speed for automatic engine stopping with a small amount of engine starter degradation decreases as distance traveled by the vehicle increases. Likewise, maximum engine speed for permitting automatic engine stopping for an engine starter exhibiting a higher amount of degradation (curve 416) decreases to show that the maximum engine speed for automatic engine stopping with a larger amount of engine starter degradation decreases as distance traveled by the vehicle increases. The maximum engine speed for permitting automatic engine stopping responsive to percentage of engine starter life consumed at the present distance traveled by the vehicle (curve 418) follows and stays equal to the maximum engine speed for automatic engine stopping for an engine starter exhibiting a low amount of degradation (curve 418).

The maximum vehicle speed for permitting automatic engine stopping for an engine starter exhibiting a low amount of degradation (curve 420) decreases to show that the maximum vehicle speed for automatic engine stopping with a small amount of engine starter degradation decreases as distance traveled by the vehicle increases. Likewise, maximum vehicle speed for permitting automatic engine stopping for an engine starter exhibiting a higher amount of degradation (curve 422) decreases to show that the maximum vehicle speed for automatic engine stopping with a larger amount of engine starter degradation decreases as distance traveled by the vehicle increases. The maximum vehicle speed for permitting automatic engine stopping responsive to percentage of engine starter life consumed at the present distance traveled by the vehicle (curve 424) follows and stays equal to the maximum vehicle speed for automatic engine stopping for an engine starter exhibiting a low amount of degradation (curve 420).

The maximum engine starter temperature for permitting automatic engine stopping for an engine starter exhibiting a low amount of degradation (curve 430) decreases to show that the maximum engine starter temperature for automatic engine stopping with a small amount of engine starter degradation decreases as distance traveled by the vehicle increases. Likewise, maximum engine starter temperature for permitting automatic engine stopping for an engine starter exhibiting a higher amount of degradation (curve 436) decreases to show that the maximum engine starter temperature for automatic engine stopping with a larger amount of engine starter degradation decreases as distance traveled by the vehicle increases. The maximum engine starter temperature for permitting automatic engine stopping responsive to percentage of engine starter life consumed at the present distance traveled by the vehicle (curve 432) follows and stays equal to the maximum engine starter temperature for automatic engine stopping for an engine starter exhibiting a low amount of degradation (curve 430).

The minimum predicted engine stop duration for automatic engine stopping for an engine starter exhibiting a low amount of degradation (curve 444) increases to show that the minimum predicted engine stop duration after an automatic engine stop for permitting automatic engine stopping with a small amount of engine starter degradation increases as distance traveled by the vehicle increases. Likewise, minimum predicted engine stopping duration after an automatic engine stop for permitting automatic engine stopping for an engine starter exhibiting a higher amount of degradation (curve 440) increases to show that minimum predicted engine stopping duration after an automatic engine stop for permitting automatic engine stopping with a larger amount of engine starter degradation increases as distance traveled by the vehicle increases. The minimum predicted engine stopping duration after an automatic engine stop for permitting automatic engine stopping responsive to percentage of engine starter life consumed at the present distance traveled by the vehicle (curve 442) follows and stays equal to the minimum predicted engine stopping duration after an automatic engine stop for permitting automatic engine stopping for an engine starter exhibiting a low amount of degradation (curve 444).

At distance D1, the amount of time in the first plot and the distance traveled continue to increase. The estimated percent of engine starter life consumed (curve 406) increases to a value greater than the predetermined percent of engine starter life consumed threshold (curve 404). Consequently, the minimum engine temperature for automatic engine stopping is adjusted to a higher level that is equal to the minimum engine temperature threshold for automatic engine stopping for an engine starter exhibiting a higher amount of degradation (curve 408). Therefore, the engine is permitted to automatically stop and start when engine temperature is at a higher level so that the engine starter may be exposed to less rigorous conditions to extend engine starter life. The maximum engine speed for permitting automatic engine stopping is adjusted to a lower level that is equal to the maximum engine speed threshold for automatic engine stopping for an engine starter exhibiting a higher amount of degradation (curve 416). As a result, the engine is permitted to automatically stop and start when engine speed is at a lower level so that conditions that may accelerate engine starter degradation to a level greater than desired may be avoided. The maximum vehicle speed for permitting automatic engine stopping (curve 424) is adjusted to a lower level that is equal to the maximum vehicle speed threshold for permitting automatic engine stopping for an engine starter exhibiting a higher amount of degradation (curve 422). This change permits the engine to automatically stop and start when vehicle speed is lower; thereby, potentially reducing the actual total number of automatic engine stops and start to reduce the possibility of engine starter degradation exceeding a desired level. The maximum engine starter temperature for permitting automatic engine stopping (curve 432) is adjusted to a lower level that is equal to the maximum engine starter temperature threshold for permitting automatic engine stopping for an engine starter exhibiting a higher amount of degradation (curve 436). This change permits the engine to automatically stop and start when engine starter temperature is lower; thereby, potentially reducing an amount of current flowing to the engine starter during engine starting so that the possibility of engine starter degradation exceeding a desired level may be reduced. The minimum predicted engine stopping duration after an automatic engine stop is adjusted to a higher level that is equal to the minimum predicted engine stopping duration after an automatic engine stop threshold for automatic engine stopping for an engine starter exhibiting a higher amount of degradation (curve 440). Therefore, the engine is permitted to automatically stop and start when predicted engine stopping duration after an automatic engine stop is at a higher level so that the engine starter may be exposed to less frequent engine starting to extend engine starter life.

Between distance D1 and distance D2, the amount of time increases and the distance traveled by the vehicle increases. The estimated percent of engine starter life consumed (curve 406) remains above the predetermined percent of engine starter life consumed (curve 404), but the measured percentage of engine starter life consumed increases at a slow rate. In addition, the expected relationship between percent of engine starter life consumed and distance traveled by the vehicle (curve 404) continues to increase.

The minimum engine temperature for automatic engine stopping for an engine starter exhibiting a low amount of degradation (curve 412) increases and the minimum engine temperature for automatic engine stopping for an engine starter exhibiting a higher amount of degradation (curve 408) also increases with distance traveled. The minimum engine temperature for automatic engine stopping responsive to percentage of engine starter life consumed at the present distance traveled by the vehicle (curve 410) follows and stays equal to the minimum engine temperature threshold for automatic engine stopping for an engine starter exhibiting a higher amount of degradation (curve 408). Adjusting the minimum engine temperature for automatic engine stopping responsive to engine starter life consumed in this way may extend engine starter life and reduce a rate of engine starter degradation.

The maximum engine speed for permitting automatic engine stopping for an engine starter exhibiting a low amount of degradation (curve 414) decreases and the maximum engine speed for permitting automatic engine stopping for an engine starter exhibiting a higher amount of degradation (curve 416) also decreases. The maximum engine speed for permitting automatic engine stopping responsive to percentage of engine starter life consumed at the present distance traveled by the vehicle (curve 418) follows and stays equal to the maximum engine speed threshold for automatic engine stopping for an engine starter exhibiting a higher amount of degradation (curve 416) to extend engine starter life. The maximum vehicle speed for permitting automatic engine stopping responsive to percentage of engine starter life consumed at the present distance traveled by the vehicle (curve 424) follows and stays equal to the maximum vehicle speed threshold for permitting automatic engine stopping for an engine starter exhibiting a higher amount of degradation (curve 422). The maximum engine starter temperature for permitting automatic engine stopping responsive to percentage of engine starter life consumed at the present distance traveled by the vehicle (curve 432) follows and stays equal to the maximum engine starter temperature threshold for permitting automatic engine stopping for an engine starter exhibiting a higher amount of degradation (curve 436).

The minimum predicted engine stopping duration after an automatic engine stop for permitting automatic engine stopping for an engine starter exhibiting a low amount of degradation (curve 444) increases and the minimum predicted engine stopping duration after an automatic engine estop for permitting automatic engine stopping for an engine starter exhibiting a higher amount of degradation (curve 440) also increases with distance traveled. The minimum predicted engine stopping duration after an automatic engine stop for permitting automatic engine stopping responsive to percentage of engine starter life consumed at the present distance traveled by the vehicle (curve 442) follows and stays equal to the minimum predicted engine stopping duration after an automatic engine stop threshold for permitting automatic engine stopping for an engine starter exhibiting a higher amount of degradation (curve 440). Adjusting the minimum predicted engine stopping duration after an automatic engine stop for permitting automatic engine stopping responsive to engine starter life consumed in this way may extend engine starter life and reduce a rate of engine starter degradation.

At distance D2, the amount of time in the first plot and the distance traveled continue to increase. The estimated percent of engine starter life (curve 406) consumed falls below the predetermined percent of engine starter life consumed threshold (curve 404). Therefore, the minimum engine temperature for automatic engine stopping is adjusted to a lower level that is equal to the minimum engine temperature threshold for automatic engine stopping for an engine starter exhibiting a low amount of degradation (curve 412). This allows the engine to be automatically stopped and started when engine temperature is at a lower level so that vehicle fuel economy may be increased. The maximum engine speed for permitting automatic engine stopping is also adjusted to a higher level that is equal to the maximum engine speed threshold for automatic engine stopping for an engine starter exhibiting a low amount of degradation (curve 414). This action allows the engine to be automatically stopped and started when engine speed is at a higher level so that vehicle fuel economy may be increased. The maximum vehicle speed for permitting automatic engine stopping is adjusted to a higher level that is equal to the maximum vehicle speed threshold for permitting automatic engine stopping for an engine starter exhibiting a lower amount of degradation (curve 420) so that vehicle fuel economy may be increased. The maximum engine starter temperature for permitting automatic engine stopping is adjusted to a higher level that is equal to the maximum engine starter temperature threshold for permitting automatic engine stopping for an engine starter exhibiting a lower amount of degradation (curve 430) so that vehicle fuel economy may be increased. The minimum predicted engine stopping duration after an automatic engine stop for permitting automatic engine stopping is adjusted to a lower level that is equal to the minimum predicted engine stopping duration after an automatic engine stop threshold for automatic engine stopping for an engine starter exhibiting a low amount of degradation (curve 444). This allows the engine to be automatically stopped and started when the predicted engine stopping duration after an automatic engine stop is at a lower level so that vehicle fuel economy may be increased.

Between distance D2 and distance D3, the amount of time increases and the distance traveled by the vehicle increases. The estimated percent of engine starter life consumed (curve 406) remains below the predetermined percent of engine starter life consumed threshold (curve 404) so the engine starter is estimated to exhibit a lower level of degradation. Additionally, the percentage of engine starter useful life consumed threshold (curve 404) continues to increase.

The minimum engine temperature for automatic engine stopping for an engine starter exhibiting a low amount of degradation (curve 412) continues to increase and the minimum engine temperature for automatic engine stopping for an engine starter exhibiting a higher amount of degradation (curve 408) continues to increase with distance traveled. The minimum engine temperature for automatic engine stopping responsive to percentage of engine starter life consumed at the present distance traveled by the vehicle (curve 410) follows and stays equal to the minimum engine temperature threshold for automatic engine stopping for an engine starter exhibiting a low amount of degradation (curve 412).

The maximum engine speed threshold for permitting automatic engine stopping for an engine starter exhibiting a low amount of degradation (curve 414) continues to decrease and the maximum engine speed threshold for permitting automatic engine stopping for an engine starter exhibiting a higher amount of degradation (curve 416) also continues to decrease. The maximum engine speed for permitting automatic engine stopping responsive to percentage of engine starter life consumed at the present distance traveled by the vehicle (curve 418) follows and stays equal to the maximum engine speed threshold for automatic engine stopping for an engine starter exhibiting a low amount of degradation (curve 414) to improve vehicle fuel economy. The maximum vehicle speed for permitting automatic engine stopping responsive to percentage of engine starter life consumed at the present distance traveled by the vehicle (curve 424) follows and stays equal to the maximum vehicle speed threshold for permitting automatic engine stopping for an engine starter exhibiting a lower amount of degradation (curve 420). The minimum predicted engine stopping duration after an automatic engine stop for permitting automatic engine stopping for an engine starter exhibiting a low amount of degradation (curve 444) continues to increase and the minimum engine temperature for automatic engine stopping for an engine starter exhibiting a higher amount of degradation (curve 440) continues to increase with distance traveled. The minimum predicted engine stopping duration after an automatic engine stop for permitting automatic engine stopping responsive to percentage of engine starter life consumed at the present distance traveled by the vehicle (curve 442) follows and stays equal to the minimum engine stopping duration after an automatic engine stop threshold for automatic engine stopping for an engine starter exhibiting a low amount of degradation (curve 444).

At distance D3, the amount of time in the first plot and the distance traveled continue to increase. The measured percent of engine starter life consumed increases to a value greater than the predetermined percent of engine starter life consumed (curve 404) for a second time. Therefore, the minimum engine temperature for automatic engine stopping (curve 410) is adjusted to a higher level that is equal to the minimum engine temperature threshold for automatic engine stopping for an engine starter exhibiting a higher amount of degradation (curve 408). This action allows the engine to automatically stop and start when engine temperature is at a higher level so that the engine starter may be exposed to less rigorous conditions to extend engine starter life. The maximum engine speed for permitting automatic engine stopping (curve 418) is also adjusted to a lower level that is equal to the maximum engine speed threshold for automatic engine stopping for an engine starter exhibiting a higher amount of degradation (curve 416). In this way, the engine is permitted to automatically stop and start when engine speed is at a lower level, instead of a higher level, so that conditions that may accelerate engine starter degradation to a level greater than desired may be avoided. The maximum vehicle speed for permitting automatic engine stopping (curve 424) is adjusted to a lower level that is equal to the maximum vehicle speed threshold for permitting automatic engine stopping for an engine starter exhibiting a higher amount of degradation (curve 422) so that the engine may only automatically stop and start when vehicle speed is lower. The maximum engine starter temperature for permitting automatic engine stopping (curve 432) is adjusted to a lower level that is equal to the maximum engine starter temperature for permitting automatic engine stopping for an engine starter exhibiting a higher amount of degradation (curve 436) so that the engine may only automatically stop and start when engine starter temperature is lower. The minimum predicted engine stop duration after an automatic engine stop (curve 442) is adjusted to a higher level that is equal to the minimum predicted engine stopping duration after an automatic engine stop threshold for permitting automatic engine stopping for an engine starter exhibiting a higher amount of degradation (curve 440). This action allows the engine to automatically stop and start when the predicted engine stopping duration after an automatic engine stop is at a higher level so that the engine starter may be exposed to fewer engine starts over a period of time to extend engine starter life.

In this way, thresholds that define whether or not an engine may be automatically stopped and started may be adjusted to compensate for engine starter life consumed. This may help to ensure that a vehicle may travel a desired distance before degradation of the engine starter may be expected.

Referring now to FIG. 5, a flow chart describing a method for controlling degradation of an engine starter of a start/stop vehicle is shown. The method of FIG. 5 may be incorporated into and may cooperate with the system of FIGS. 1 and 2 to provide the operating sequence shown in FIG. 4. Further, at least portions of the method of FIG. 5 may be incorporated as executable instructions stored in non-transitory memory while other portions of the method may be performed via a controller transforming operating states of devices and actuators in the physical world.

At 502, method 500 estimates a percentage of engine starter life that has been consumed. One estimate of engine starter life consumed is provided for an engine starter. The amount of engine starter life consumed may be estimated via the following equation:

$$ESLC = \Sigma_i^n f_i(EOT, ECT, Is, t, Nec, Nv)$$

where ESLC is engine starter life consumed, f is a function that estimates percentage of engine starter system life consumed during an engine starting event (e.g., a period of time between when a motor is applied to accelerate an engine that is below engine idle speed to a time when engine speed is at idle speed or above and the engine is combusting air and fuel to maintain engine idle speed), EOT is engine oil temperature, ECT is engine coolant temperature, Is is engine starter cranking current, t is total engine cranking time or starting time, Nec is engine speed at time of cranking, Nv is vehicle speed at time of engine cranking, and i is the actual total number of engine starting events. An engine starting event may begin after an engine start request is made and a motor begins to accelerate the engine. An engine starting event may end when the engine accelerates to engine idle speed and maintains idle speed or a greater speed via combusting air and fuel in the engine. The value of i is incremented for each new engine starting event. In one example, function f is outputs empirically determined values of percentage of engine starter life consumed for an engine starter responsive to EOT, ECT, Is, t, Nec, and Nv.

The parameter EOT provides an indication of engine oil temperature, which may be useful to determine engine starter stress since higher viscosity engine oil occurs at lower engine temperatures and may increase stress on an engine starter. By factoring EOT into engine starter life consumption, a more accurate estimate of engine starter life may be provided. The parameter ECT provides an indication of engine coolant temperature, which may be useful to determine engine starter stress since a colder engine may provide more engine friction than a warmer engine, which may increase stress on an engine starter. By factoring ECT into engine starter life consumption, a more accurate estimate of engine starter life may be provided. The parameter Is provides an indication of engine starter current, which may be useful to determine engine starter wiring stress since higher currents may stress starter windings. By factoring Is into engine starter life consumption, a more accurate estimate of engine starter life may be provided. The parameter t provides an indication of how long the starter is applied to start the engine, which may be useful to determine engine starter stress since longer starting times may increase stress on an engine starter. By factoring starting time into engine starter life consumption, a more accurate estimate of engine starter life may be provided. The parameter Nec provides an indication of engine speed at time of engine cranking, which may be useful to determine engine starter stress related to pinion engagement and component impacts that may increase engine starter degradation. By factoring Nec into engine starter life consumption, a more accurate estimate of engine starter life may be provided. The parameter Nv provides an indication of vehicle speed at time of engine cranking, which may be useful to determine engine starter stress related to vehicle speed since vehicle speed may affect engine starter life by reducing or increasing stress on the engine starter. For example, if vehicle speed is greater than a threshold, at least a portion of the vehicle's kinetic energy may be used to assist the engine starter, thereby reducing stress on the starter. By factoring vehicle speed into engine starter life consumption, a more accurate estimate of engine starter life may be provided. Method 500 proceeds to 504.

At 504, method 500 adjusts the engine starter useful life consumed threshold (e.g., 404 of FIG. 4). The engine starter useful life consumed threshold may be expressed as a polynomial. The coefficients of the polynomial may be adjusted responsive to vehicle operating conditions to increase the respective useful life consumed threshold or decrease the useful life threshold with respect to distance the vehicle travels. For example, if the useful life threshold is approximated by:

$$ESUL = a + bD + cD^2$$

where ESUL is the percentage of engine starter useful life consumed, a is a first coefficient, b is a second coefficient, c is a third coefficient, and D is distance traveled by the vehicle. Coefficients a, b, and c may be adjusted to increase ESUL for a given D or decrease ESUL for the given D. For example, coefficient a may be a function of ambient temperature, ambient humidity, and other vehicle operating conditions, and the state of the vehicle operating conditions may operate to modify coefficient a. Method 500 proceeds to 506 after adjusting the engine starter useful life threshold.

At 506, method 500 judges if the percentage of actual engine starter useful life consumed is greater than the engine starter useful life consumed threshold. An example visual reference of estimated engine starter useful life consumed (e.g., 406 of FIG. 4) and the engine starter useful life consumed threshold (e.g., 404 of FIG. 4) is provided in the second plot from the top of FIG. 4. If method 500 judges that the estimated engine starter useful life consumed is greater than the engine starter useful life consumed threshold, the answer is yes and method 500 proceeds to 508. However, if the estimate of engine starter useful life consumed, does not exceed the engine starter useful life consumed threshold, the answer is no and method 500 proceeds to 510.

At 508, method 500 adjusts entry conditions that permit automatic engine starting and stopping. An engine may be automatically started and stopped without a driver requesting engine start or stop through a dedicated input for engine starting and stopping (e.g., an ignition switch or key switch). In particular, an engine may be stopped when driver demand torque as determined from an accelerator pedal position or an autonomous vehicle controller output is less than a threshold. However, the engine may not be permitted to automatically stop and start responsive to driver demand unless other conditions are also met. For example, for an automatic engine stop to be permitted, engine temperature must be greater than a minimum or lower engine temperature threshold. Further, for an automatic engine stop to be permitted, engine speed must be less than a threshold engine speed. In addition, for an automatic engine stop to be permitted, vehicle speed may have to be less than a vehicle speed threshold. Further, engine starter temperature must be less than an engine starter temperature threshold. The thresholds against which vehicle operating conditions are compared to before allowing or rejecting automatic engine stopping and starting may be referred to as entry conditions for automatically stopping the engine (e.g., automatically ceasing engine rotation). Similar entry conditions are provided for automatically starting an engine that is stopped and not rotating.

The entry conditions or thresholds may require different conditions to be met before an engine is automatically stopped or started as a distance the vehicle travels increases. For example, as shown in FIG. 4, engine temperature may be compared to a minimum or lower engine temperature threshold to determine if automatic engine stopping is permitted. The minimum engine temperature threshold may increase as a distance the vehicle travels increases. The minimum engine temperature threshold may be set to a minimum engine temperature threshold above which the engine may be automatically stopped for an engine starter exhibiting low degradation (curve 412) or a minimum engine temperature threshold at which the engine may be automatically stopped for an engine starter exhibiting higher degradation (curve 408). At 508, method 500 may require that engine temperature be greater than the minimum engine temperature threshold. Method 500 may also require that the minimum engine temperature threshold be equal to an engine temperature threshold for automatic engine stopping for an engine starter exhibiting a higher amount of degradation (curve 408) when the actual percentage of engine starter useful life consumed is greater than the expected engine starter useful life threshold. For a particular distance traveled by the vehicle, the minimum engine temperature threshold for permitting automatic engine stopping for an engine starter exhibiting higher degradation is greater than the minimum engine temperature threshold for permitting automatic engine stopping for an engine starter exhibiting less degradation as shown in FIG. 3.

Engine speed may be compared to a maximum engine speed threshold for permitting automatic engine stopping, and the maximum engine speed threshold may be decreased as a distance the vehicle travels increases. Additionally, there may be a maximum engine speed threshold below which the engine may be automatically stopped for an engine starter exhibiting low degradation (curve 414) and a maximum engine speed threshold below which the engine may be automatically stopped for an engine starter exhibiting higher degradation (curve 416). At 508, method 500 may require that the engine speed be less than the maximum engine speed threshold. Method 500 may also require that the maximum engine speed threshold be equal to an engine speed for automatic engine stopping for an engine starter exhibiting higher degradation (curve 416) when the actual percentage of engine starter useful life consumed is greater than the expected engine starter useful life threshold. The maximum engine speed threshold for permitting automatic engine stopping for an engine starter exhibiting higher degradation is less than the maximum engine speed threshold for permitting automatic engine stopping for an engine starter exhibiting less degradation as shown in FIG. 4.

The maximum vehicle speed at which an engine may be automatically be stopped may decrease as a distance the vehicle travels increases so that the possibility of stopping the engine may be reduced, thereby reducing possibility of degrading engine stop/start system components. There may also be a maximum vehicle speed threshold at which the engine may be automatically stopped for an engine starter exhibiting low degradation and a maximum vehicle threshold at which the engine may be automatically stopped for an engine starter exhibiting higher degradation. At 508, method 500 may require that the vehicle speed be less than the maximum vehicle speed threshold. Method 500 may also require that the maximum vehicle speed threshold be equal to a maximum vehicle speed threshold for automatic engine stopping for an engine starter exhibiting higher degradation when the actual percentage of engine starter useful life consumed is greater than the expected engine starter life threshold. The maximum vehicle speed threshold for an engine starter exhibiting higher degradation is less than the maximum vehicle speed threshold for an engine starter exhibiting less degradation as shown in FIG. 4.

The maximum engine starter temperature at which an engine may be automatically be stopped may decrease as a distance the vehicle travels increases so that the possibility of stopping the engine may be reduced, thereby reducing possibility of degrading the engine starter. There may also be a maximum engine starter temperature threshold at which the engine may be automatically stopped for an engine starter exhibiting low degradation and a maximum engine starter temperature threshold at which the engine may be automatically stopped for an engine starter exhibiting higher degradation. At 508, method 500 may require that the engine starter temperature be less than the maximum engine starter temperature threshold. Method 500 may also require that the maximum engine starter temperature threshold be equal to a maximum engine starter temperature threshold for automatic engine stopping for an engine starter exhibiting higher degradation when the actual percentage of engine starter useful life consumed is greater than the expected engine starter life threshold. The maximum vehicle speed threshold for an engine starter exhibiting higher degradation is less than the maximum vehicle speed threshold for an engine starter exhibiting less degradation as shown in FIG. 4.

Engine oil temperature may be compared to a minimum engine oil temperature threshold for permitting automatic engine stopping, and the minimum engine oil temperature threshold may be increased as a distance the vehicle travels increases. Additionally, there may be a minimum engine oil temperature threshold below which the engine may be automatically stopped for an engine starter exhibiting low degradation and a minimum engine oil temperature threshold below which the engine may be automatically stopped for an engine starter exhibiting higher degradation. At 508, method 500 may require that the engine oil temperature be greater than the minimum engine oil temperature threshold. Method 500 may also require that the minimum engine oil temperature threshold be equal to an engine oil temperature threshold for automatic engine stopping for an engine starter exhibiting higher degradation when the actual percentage of engine starter useful life consumed is greater than the expected engine starter useful life threshold. The minimum engine oil temperature threshold for permitting automatic engine stopping for an engine starter exhibiting higher degradation is less than the minimum engine oil temperature threshold for permitting automatic engine stopping for an engine starter exhibiting less degradation.

A time interval from a most recent engine stopping (e.g., engine combustion ceases and engine decelerates toward zero speed) event may be compared to a minimum engine stopping interval threshold for permitting automatic engine stopping, and the minimum engine stopping interval threshold may be increased as a distance the vehicle travels increases. Additionally, there may be a minimum engine stopping interval threshold above which the engine may be automatically stopped for an engine starter exhibiting low degradation and a minimum engine stopping interval threshold above which the engine may be automatically stopped for an engine starter exhibiting higher degradation. At 508, method 500 may require that the time interval from the most recent engine stop to the present time be greater than the minimum engine stopping interval threshold. Method 500 may also require that the minimum engine stopping interval threshold be equal to an minimum engine stopping interval for automatic engine stopping for an engine starter exhibiting higher degradation when the actual percentage of engine starter useful life consumed is greater than the expected engine starter useful life threshold. The minimum engine stopping interval threshold for permitting automatic engine stopping for an engine starter exhibiting higher degradation is less than the minimum engine stopping interval threshold for permitting automatic engine stopping for an engine starter exhibiting less degradation.

The minimum predicted engine stopping duration after an automatic engine stop for allowing automatic engine stopping may be increased as a distance the vehicle travels increases so that the frequency of use of the engine starter may be reduced as distance traveled by the vehicle increases, thereby reducing lowering the possibility of degrading the engine starter as vehicle travel distance increases. There may also be a minimum predicted engine stop duration after automatic engine stopping threshold at which the engine may be automatically stopped for an engine starter exhibiting low degradation and a minimum predicted engine stop duration after automatic engine stopping threshold at which the engine may be automatically stopped for an engine starter exhibiting higher degradation. At 508, method 500 may require that the predicted engine stopping duration after an automatic engine stop be greater than the minimum predicted engine stopping duration threshold (e.g., curve 442 of FIG. 4B). Method 500 may also require that the minimum predicted engine stopping duration after an automatic engine stop threshold be equal to a minimum predicted engine stopping duration after an automatic engine stop threshold for automatic engine stopping for an engine starter exhibiting higher degradation when the actual percentage of engine starter useful life consumed is greater than the expected engine starter life threshold. The minimum predicted engine stopping duration after an automatic engine stop threshold for an engine starter exhibiting higher degradation is greater than the minimum predicted engine stopping duration after an automatic engine stop threshold for an engine starter exhibiting less degradation as shown in FIG. 4B.

Alternatively, instead of adjusting the minimum engine temperature for automatic engine stopping from a threshold for low engine starter degradation to a minimum engine temperature threshold for higher engine starter degradation, a single threshold for minimum engine temperature for automatic engine stopping may be adjusted to a higher level or a lower level via adjusting coefficients of a polynomial that describes the minimum engine temperature threshold. Similarly, coefficients of polynomials describing maximum engine speed for permitting automatic engine stopping and maximum vehicle speed for permitting automatic engine stopping may be adjusted to lower or raise the maximum engine speed and maximum vehicle speed at which the engine may be automatically stopped. Method 500 proceeds to 512.

At 510, method 500 adjusts entry conditions for automatic engine stopping and starting to base levels. Method 500 requires that engine temperature be greater than the minimum engine temperature threshold for automatic engine stopping for an engine starter exhibiting lower degradation (curve 412) when the actual percentage of engine starter useful life consumed is less than the expected engine starter useful life threshold. Method 500 requires that engine speed be less than a maximum engine speed threshold for automatic engine stopping for an engine starter exhibiting lower degradation (curve 414) when the actual percentage of engine starter useful life consumed is less than the expected engine starter useful life threshold. Additionally, method 500 requires that vehicle speed be less than a maximum vehicle speed threshold for automatic engine stopping for an engine starter exhibiting lower degradation (curve 420). Method 500 also requires that engine starter temperature be less than a maximum engine starter temperature threshold for automatic engine stopping for an engine starter exhibiting lower degradation (curve 430). Method 500 requires that predicted engine stopping duration after an automatic engine stop be greater than the minimum predicted engine stopping duration after an automatic engine stop threshold for permitting automatic engine stopping for an engine starter exhibiting lower degradation (curve 444) when the actual percentage of engine starter useful life consumed is less than the expected engine starter useful life threshold. Method 500 proceeds to 512.

At 512, method 500 automatically stops and starts the engine according to the entry condition thresholds and entry conditions previously mentioned. The engine may automatically be stopped and started via a controller judging whether or not the entry conditions previously mentioned have been met. Method 500 proceeds to exit.

Thus, the method of FIG. 5 provides for a vehicle operating method, comprising: estimating an amount of engine starter useful life consumed via a controller; adjusting automatic engine stop/start thresholds in response to the amount of engine starter useful life consumed; and starting or stopping the engine in response to the automatic engine start/stop thresholds via the controller. The method includes where the automatic engine stop/start thresholds include a minimum engine temperature threshold for permitting automatic engine stopping responsive to a percentage of useful engine starter life consumed. The method includes where the automatic engine stop/start thresholds include a maximum engine speed threshold for permitting automatic engine stopping responsive to a percentage of useful engine starter life consumed.

In some examples, the method includes where the automatic engine stop/start thresholds include a maximum vehicle speed for permitting automatic engine stopping responsive to a percentage of useful engine starter life consumed. The method includes where the engine starter is selectively engaged and disengaged from an engine. The method includes where the engine starter is a belt driven starter/generator. The method includes where the engine starter is an integrated starter generator positioned between an engine and a transmission in a powertrain.

The method of FIG. 5 also provides for a vehicle operating method, comprising: estimating an amount of useful life consumed of an engine starter via a controller, the amount of useful life consumed a summation of individual estimates; adjusting automatic engine stop/start thresholds in response to the amount of useful life consumed; and automatically starting or stopping the engine in response to the automatic engine start/stop thresholds via the controller. The method includes where the summation is a function of engine coolant temperature. The method includes where the summation is a function of engine speed. The method includes where the summation is a function of vehicle speed.

In some examples, the method includes where the automatic engine stop/start thresholds include a minimum engine temperature threshold for permitting automatic engine stopping responsive to a percentage of useful engine starter life consumed. The method includes where the automatic engine stop/start thresholds include a maximum engine speed threshold for permitting automatic engine stopping responsive to a percentage of useful engine starter life consumed. The method includes where the automatic engine stop/start thresholds include a maximum vehicle speed for permitting automatic engine stopping responsive to a percentage of useful engine starter life consumed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
   estimating an amount of engine starter useful life consumed via a controller;
   adjusting an engine starter useful life threshold via the controller responsive to vehicle operating conditions;
   adjusting automatic engine stop/start thresholds in response to the amount of engine starter useful life consumed exceeding the engine starter useful life threshold; and
   starting or stopping an engine in response to the automatic engine start/stop thresholds via the controller.

2. The method of claim 1, where the automatic engine stop/start thresholds include a minimum engine temperature threshold for permitting automatic engine stopping responsive to a percentage of useful engine starter life consumed, where the vehicle operating conditions include ambient temperature, and further comprising:
   comparing the amount of engine starter useful life consumed to the engine starter useful life threshold.

3. The method of claim 1, where the automatic engine stop/start thresholds include a maximum engine speed threshold for permitting automatic engine stopping responsive to a percentage of useful engine starter life consumed.

4. The method of claim 1, where the automatic engine stop/start thresholds include a maximum vehicle speed for permitting automatic engine stopping responsive to a percentage of useful engine starter life consumed, and where the percentage of engine starter useful life consumed is a function of vehicle speed at a time of engine cranking and engine cranking current at the time of engine cranking.

5. The method of claim 1, where an engine starter is selectively engaged and disengaged from the engine, and where the engine starter useful life consumed is a function of engine speed at a time of engine cranking.

6. The method of claim 5, where the engine starter is a belt driven starter/generator.

7. The method of claim 1, where an engine starter is an integrated starter generator positioned between the engine and a transmission in a powertrain.

8. A vehicle operating method, comprising:
   estimating an amount of useful life consumed of an engine starter via a controller, the amount of useful life consumed a summation of individual estimates including vehicle speed at a time of engine cranking, engine speed at the time of engine cranking, engine cranking current, and engine oil temperature;
   adjusting automatic engine stop/start thresholds in response to the amount of useful life consumed; and
   automatically starting or stopping an engine in response to the automatic engine start/stop thresholds via the controller.

9. The method of claim 8, where the summation is a function of engine temperature, and further comprising:
   adjusting an engine starter useful life threshold via the controller responsive to vehicle operating conditions.

10. The method of claim 8, where the summation is a function of engine speed.

11. The method of claim 8, where the summation is a function of vehicle speed.

12. The method of claim 8, where the automatic engine stop/start thresholds include a minimum engine temperature threshold for permitting automatic engine stopping responsive to a percentage of useful engine starter life consumed.

13. The method of claim 8, where the automatic engine stop/start thresholds include a maximum engine speed threshold for permitting automatic engine stopping responsive to a percentage of useful engine starter life consumed.

14. The method of claim 8, where the automatic engine stop/start thresholds include a maximum vehicle speed for permitting automatic engine stopping responsive to a percentage of useful engine starter life consumed and a minimum predicted engine stop duration for permitting automatic engine stopping.

15. A vehicle system, comprising:
   an engine including an engine starter that selectively engages and disengages the engine; and
   a controller including non-transitory instructions executable to adjust automatic engine stop/start thresholds in response to an amount of useful life consumed of the engine starter exceeding an engine starter useful life threshold, and to automatically start or stop the engine in response to the automatic engine start/stop thresholds, the automatic engine start/stop thresholds including a minimum predicted engine stop duration after an automatic engine stop threshold, and additional instructions executable to adjust the engine starter useful life threshold via the controller responsive to vehicle operating conditions.

16. The vehicle system of claim 15, where the engine starter is an integrated starter/generator, and where the automatic engine stop/start thresholds include vehicle speed at a time of engine cranking, engine speed at the time of engine cranking, engine cranking current, and engine oil temperature.

17. The vehicle system of claim 15, where the engine starter is a belt driven starter/generator.

18. The vehicle system of claim 15, where the automatic engine stop/start thresholds include a maximum engine starter temperature threshold.

19. The vehicle system of claim 15, where the automatic engine stop/start thresholds include a maximum engine speed threshold.

* * * * *